United States Patent
Zimmermann et al.

(10) Patent No.: US 8,862,344 B2
(45) Date of Patent: Oct. 14, 2014

(54) CLUTCH ACTUATOR AND METHOD FOR THE CONTROL THEREOF

(75) Inventors: Martin Zimmermann, Sasbach (DE); Matthias Gramann, Renchen (DE); Juergen Gerhart, Appenweier (DE); Martin Rapp, Buehl (DE); Wolfgang Hill, Karlsruhe (DE); Michael Menzel, Steinheim (DE); Wai-Wai Buchet, Strasbourg (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 441 days.

(21) Appl. No.: 12/828,410

(22) Filed: Jul. 1, 2010

(65) Prior Publication Data

US 2011/0054754 A1  Mar. 3, 2011

Related U.S. Application Data

(63) Continuation of application No. PCT/DE2008/002072, filed on Dec. 11, 2008.

(30) Foreign Application Priority Data

Jan. 2, 2008  (DE) .......................... 10 2008 003 048

(51) Int. Cl.
*F16H 59/00* (2006.01)
*B60W 10/00* (2006.01)
*F16D 48/06* (2006.01)
*F16H 61/12* (2010.01)

(52) U.S. Cl.
CPC ........ *F16D 48/064* (2013.01); *F16D 2500/501* (2013.01); *F16D 2500/1086* (2013.01); *F16H 2061/1276* (2013.01); *F16D 2500/1023* (2013.01); *F16D 2500/5114* (2013.01); *F16H 2061/1268* (2013.01); *F16H 2061/1208* (2013.01); *F16H 61/12* (2013.01); *F16D 2500/70424* (2013.01); *F16H 2061/1224* (2013.01); *F16D 2500/5108* (2013.01)
USPC ........ 701/51; 701/67; 701/68; 477/8; 477/86; 477/174; 477/175; 477/179; 180/337; 180/338; 180/339; 74/661; 74/664

(58) Field of Classification Search
CPC ............ Y10S 477/902; Y10S 477/906; Y10S 903/946
USPC ........ 701/68, 51, 67; 477/181, 174, 175, 179, 477/6, 8, 86, 98; 180/292, 293, 294, 338, 180/339, 65.25; 74/661, 664; 903/905, 909, 903/914, 917, 945, 946, 951
See application file for complete search history.

(56) References Cited

U.S. PATENT DOCUMENTS

2007/0080004 A1* 4/2007 Pfund .......................... 180/65.2

FOREIGN PATENT DOCUMENTS

DE 199 36 886 Y 3/2001
EP 0 798 497 A 10/1997
(Continued)

*Primary Examiner* — Adam Tissot
(74) *Attorney, Agent, or Firm* — Lucas & Mercanti, LLP

(57) ABSTRACT

A clutch actuator and to a method for the control thereof. The actuator actuates a multi-disk clutch, and to do so has actuator modules. The number of which corresponds to the number of the friction clutches. The modules have separate control units and electric motors, which are controlled by the control units and act on the friction clutches by a disengaging mechanism. In order to counter block the partial drive trains disposed downstream of the friction clutches, particularly automatically closed friction clutches during a malfunction of an actuator module, the actuator modules are connected among each other to a data line, which allows monitoring of the actuator modules and counter-measures.

13 Claims, 2 Drawing Sheets

(56) References Cited

FOREIGN PATENT DOCUMENTS

| EP | 1 672 777 Y | 6/2006 |
| EP | 1 775 449 X | 4/2007 |
| FR | 2 815 301 A | 4/2002 |

\* cited by examiner

CLUTCH ACTUATOR AND METHOD FOR THE CONTROL THEREOF

This application is a continuation application of PCT/DE2008/002072 filed Dec. 11, 2008, which in turn claims the priority of DE 10 2008 003 048.1, filed Jan. 2, 2008, the priority of these applications is hereby claimed and these applications are incorporated by reference herein.

FIELD OF THE INVENTION

The invention relates to a clutch actuator and to a method for the control thereof for a multi-disk clutch in a multi-disk clutch transmission having a corresponding number of component drive trains.

BACKGROUND OF THE INVENTION

What are referred to as double-clutch transmissions or parallel manual transmissions which have two component drive trains which can be each coupled to an internal combustion engine by means of a friction clutch are known from the prior art. Such double clutch transmissions are shifted in that, when a gear speed is engaged in both component transmission trains, the torque of the internal combustion engine is transmitted in what is referred to as an overlap of the friction clutches from one component drive train to the other in a slipping operating mode by virtue of the fact that the previously opened friction clutch is closed and the previously opened friction clutch is closed. Outside a shifting operation, one of the two friction clutches must therefore always be open during the operating mode in order to prevent the transmission and then the drive wheels from locking.

In the event of an unforeseen functional fault in a clutch actuator, it is therefore necessary to ensure that the double clutch transmission does not lock. For this purpose, for example specially configured friction clutches are used which are open in the relaxed state and closed by means of a non self-locking clutch actuator. In the event of a functional fault, both actuator modules are disconnected from the power supply so that both friction clutches open. If, as a result, the functional faults cause an actuator module in the closed or slipping state of the associated friction clutch to stick, the sticking of the transmission is avoided by simultaneously opening the other functionally capable friction clutch. The clutch actuator with the actuator modules has to be of non-self-locking configuration here to a state which opens automatically in the currentless state, as a result of which correspondingly large actuator forces have to be made available, and in particular high-power electric motors with a corresponding installation space have to be used.

SUMMARY OF THE INVENTION

The object arises of proposing a clutch actuator and a method for the control thereof with which friction clutches can be actuated irrespective of their mode of operation, and at the same time locking of the transmission is to be avoided when there is a functional fault of an actuator module. Furthermore, the actuator forces are to be reduced.

The object is achieved by means of a clutch actuator for actuating a multi-disk clutch having at least two friction clutches composed of at least two actuator modules, each with an electric motor and a disengagement mechanism which is driven thereby and respectively acts on a friction clutch in order to actuate it, as well as a control unit for controlling and supplying power to the electric motor, wherein the actuator modules are connected to one another by means of a data line. In this context, the multi-disk clutch is advantageously a double clutch having two friction clutches, with an actuator module of the clutch actuator actuating one of the two friction clutches in each case. Each actuator module contains a control unit in which the signals for controlling the electric motor, for example the commutation thereof in the case of a brushless, electronically commutated electric motor are determined from sensors, such as Hall sensors, which detect the rotational movement of the rotor in said electric motor, and said signals are passed onto the electric motor. Furthermore, data, for example in the form of characteristic diagrams or mathematical functions, are stored in the control unit, said control unit storing an assignment of the clutch travel to the torque which is transmitted via the friction clutch which assignment is continuously updated and adapted to the physical changes in the friction clutch and the disengagement mechanism. In addition, power electronics for operating the electric motor are present in the control unit so that the actuator module is automatically capable of generating a control value which is necessary during a clutch actuation process, and of outputting it to the electric motor and monitoring the execution thereof. One of the actuator modules or all the actuator modules may contain functional software which may contain superordinate functions such as monitoring functions, communication with other on-board power system units and the like.

Only the actuator modules communicate with one another via the internal data line. The data line may use a serial transmission protocol and be based an on the transmission protocol of the known bus systems such as CAN bus, wherein there is no provision for the data line to be connected to the on-board power system and exchange data. The operating states of the individual actuator modules are advantageously exchanged via the data line and, for example, corresponding monitoring modules, which check the plausibility of the signals which are output to the electric motor, can be provided in each of the actuator modules. If a functional fault of an actuator module becomes apparent for example if the power supply of the electric motor is faulty or has failed, the electric motor is defective and therefore does not set a calculated actuation travel, the control unit itself has failed or the like, corresponding information is transmitted to the other actuator modules which, in order to avoid imminent sticking of the transmission, open the remaining friction clutches, the second friction clutch in the case of a double clutch. The functionally capable actuator modules are therefore controlled as a function of the operating state of a functionally faulty actuator module. In the event of a continuing functional fault of an actuator module, a fault signal can be transmitted in this context via the data line to at least one further actuator module, and at least one second actuator module can be operated in an emergency operating mode. In the emergency operating mode, the exclusive function of the actuator module or modules which are still functionally capable and the deactivation of the functionally faulty actuator module are initiated. In this context, the movement of the electric motor of the functionally faulty actuator module can be stopped immediately and the still functionally capable actuator modules cause the friction clutches assigned to them to open so that the transmission is prevented from sticking.

The actuator modules are advantageously each connected individually to a voltage supply of an on-board power system, and when the vehicle is activated they are actuated with a corresponding transmission, and after the vehicle has been shut down, they are switched off again. It has proven advantageous if the power supply is continuously connected to the actuator modules in the form of a supply line, and if a control line which is connected to an ignition switch, an ignition lock or some other control line which indicates the actuation is connected to the actuator modules by means of a separate plug, which control line supplies so much electrical energy during the operation that if there is a cable break or the plug of the supply line for the power supply breaks off, at least the control unit with its low power demand can continue to be supplied with power via the control line. The redundant supply of the actuator modules can also be provided in another way, for example by means of a double plug and line connections.

In a particularly advantageous way, the proposed actuator modules can be used for what are referred to as normally open friction clutches, which are closed in the relaxed state and are applied by means of an actuator module. For this purpose, the actuator modules are of self-locking designs so that in the opened state such a friction clutch only requires very small actuation forces. Owing to the reciprocal monitoring of the actuator modules for functional faults, in the event of a functional fault there is no need for self-opening of the two friction clutches. Instead, the functional fault is detected in good time by the remaining actuator module or modules, and the associated friction clutch is opened, so that the possibly no longer functionally capable friction clutch, which is therefore transmitting torque, is the only friction clutch transmitting torque and the transmission therefore cannot stick. As a result of the relatively low holding forces of the friction clutch which is open in the travel mode, in contrast to a non self-locking, normally applied friction clutch, the actuator forces can be reduced and the associated electric motors can be configured to be weaker. This may lead to a cost saving and to a lower installation space requirement of the clutch actuator.

In a further exemplary embodiment, a control unit which monitors both actuator modules may be provided, with the two actuator modules likewise being equipped as what are referred to as smart actuator modules with units equipped with own processor units. In this context, at least parts of an open-loop and closed-loop control system of a friction clutch can be anchored in the superordinate control unit, and other parts of the open-loop and closed-loop control system may be anchored in the actuator units, as can a complete data processing system for the open-loop and closed-loop control of the friction clutch in the superordinate control unit and respectively for an actuator module in the respective actuator module. It is advantageous here that monitoring functions for one actuator module are implemented in the other actuator module. In this way, irrespective of instances of the detection of a functional fault, caused possibly, for example, by a processor defect, can be monitored or checked reciprocally by the actuator modules. In the same way, the results of the functional monitoring of the two actuator modules are monitored by the superordinate control unit. In this context, it is particularly advantageous if, in order to detect a functional fault, the two monitoring units in the superordinate control unit and in the respective actuator module are set off one against the other. It is therefore possible, for example, for a functional fault to be evaluated as such only if a functional fault for an affected actuator module is determined both in the actuator unit and in the superordinate control unit. The object is also achieved by means of a method for the control of a clutch actuator for actuating a multi-disk clutch having at least two friction clutches composed of at least two actuator modules, each with an electric motor and a disengagement mechanism which is driven thereby and respectively acts on a friction clutch in order to actuate it, as well as a control unit for controlling and supplying power to the electric motor, wherein the actuator modules are connected to one another by means of a data line, and the functional capability of an actuator module is monitored by means of at least one second actuator module. According to one embodiment of the method, status information of a first actuator module is transmitted to at least one further actuator module via the data line. In this context, the at least other actuator module can check the status information for a fault of the first actuator module, and switch it to an emergency operating mode if a fault is detected, wherein in this emergency operating mode a drive of the first actuator module can be blocked and the at least one other actuator module can open the friction clutch which is assigned thereto.

Furthermore, it may be advantageous if in the emergency operating mode a signal is output to a control unit which is provided for controlling the transmission and which disengages a gear speed which is, if appropriate, engaged in a component drive train assigned to the friction clutch with the actuator module which is subject to a fault.

In the following table 1, examples of functional faults, their direct consequence for the clutch actuator and the provided reaction of the proposed clutch actuator are illustrated. Table 1 represents various functional faults for an actuator module (AM1) of a friction clutch K1 of a double clutch. In the same way, the functional faults are transferred to the actuator module 2 of the second friction clutch K2. In a first monitoring level, the functions of the plugs and lines are here, in a second monitoring level, for example, the plausibility of the control values, and in a third monitoring level, for example, the plausibility of the microprocessor which is used in the control unit.

TABLE 1

| Functional fault | Direct consequence | System reaction |
| --- | --- | --- |
| Cable break/ blowing of the fuse/dropping off of the plug at the supply line at the AM1 | AM1: Output stage without function Supply of control unit via supply line AM2: Emergency operating mode | K1: Setting frozen K2: active opening |
| Cable break/ blowing of the fuse at the control line at the AM1 | AM1: Supply of control unit via supply line AM2: None | K1; K2 No, if appropriate, message to central control unit |
| Functional fault in the 2$^{nd}$ monitoring level | AM1: Reset control unit AM2: Emergency operating mode | K1: Setting frozen K2: active opening |
| Functional fault in the 3$^{rd}$ monitoring level | AM1: Switch off output stage AM2: Emergency operating mode | K1: Setting frozen K2: Active opening |

When a clutch actuator is used with a superordinate control unit and two actuator modules each with a monitoring function for the other actuator module, wherein the actuator modules are connected to one another and to the superordinate control unit via, for example, CAN, the following functions with corresponding measures or consequences for the two friction clutches which are assigned to the actuator modules may be provided in a exemplary embodiment according to the following table 2:

BRIEF DESCRIPTION OF THE DRAWINGS

The invention is explained in more detail below with reference to FIGS. 1 to 3, in which.

DETAILED DESCRIPTION OF THE INVENTION

Figure 1:
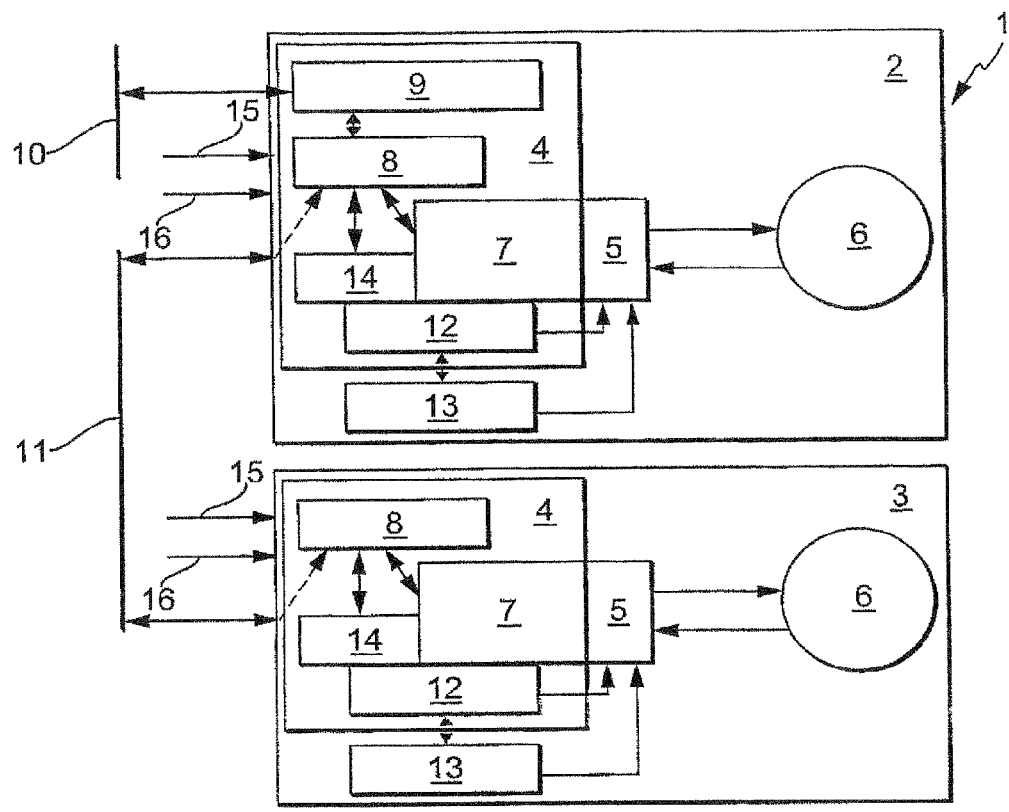
FIG. 1 shows a schematically illustrated exemplary embodiment of a clutch actuator for a double clutch with two actuator modules.

FIG. 1 is a schematic view of a clutch actuator 1 having two actuator modules 2, 3, each with a control unit 4 and an output stage with power electronics for energizing the electric motor 6. The electric motor 6 is an electronically commutated motor with Hall sensors, the signals of which are detected in the commutation unit 7 of the control unit. The electric motor is also commutated in the commutation unit 7 which transmits the commutation signals to the output stage 5 which supplies electrical energy to the electric motor 6. The control unit 4 also comprises a position controller 8, which converts corresponding actuation commands for the affected friction clutch, actuated by the electric motors 4 by means of a disengagement mechanism, into electrical actuation signals as a function of functional software 9, which can be implemented in one of the two actuator modules 2, 3 or in both actuator modules 2, 3 or in an external control unit, and monitors actuator travel which is carried out. In the exemplary embodiment shown, only the actuator module 2 has the functional software 9 and it communicates via CAN bus 10 with further control units of the vehicle. The transmission of data relating to the functional software 9 is carried out via the internal serial data line 11. In other exemplary embodiments, the actuator module 3 may, in particular, likewise have a connection to the CAN bus, with functional software which is implemented in another control unit. The functional software may be stored in the form of an ASICS or as software in the individual control units.

The actuator modules 2, 3 monitor one another for functional faults. For this purpose, monitoring is carried out in each actor module 2, 3 on multiple levels, which, in the embodiment shown, are illustrated as blocks 12, 13, and are each performing a routine independently and enable the output stage 5 when the control unit 4 functions properly. If a functional fault is determined in one of the blocks 12, 13, the output stage is switched off and the continuously updated operating status is switched over from the normal mode to the fault mode via the data line 11, for example by a fault bit being set. The transmission of the operating state can take place qualitatively, via the transmission of a fault message, or quantitatively, via the type of fault being transmitted. Depending on the fault message which is transmitted, the other actuator module reacts, for example by energizing the electric motor 6 in a regulated or unregulated fashion, and the friction clutch which is assigned to this actuator module is therefore opened. In order to react to a functional fault, it is possible to directly access the position controller 8 after the transmission of a functional fault in the other actuator module 2, 3 and/or a routine 14 for emergency operation of the functionally capable actuator module is started. In this way, it is possible, for example after the disengagement of a gear speed which is possibly engaged in the component drive train which is subject to a functional fault, the component drive train which is still functionally capable can be operated in an automated fashion with interruption of the tractive force and a restricted gear speed selection. The control of the friction clutch can be carried out by means of the routine 14 or with a routine which runs in the functional software.

The two actuator modules 2, 3 are supplied with electrical energy from the on-board power system of the motor vehicle by means of a supply line 15. The control line 16 controls the actuation and deactuation of the actuator modules 2, 3 as a function of actuation of the motor vehicle, for example by means of an ignition signal or a starter switch. The function of the energy supply of an actuator module 2, 3 can advantageously be checked by the other actuator module 3, 2. It is therefore possible, for example when the supply voltage at the supply line fails after a cable break, blowing of the fuse or dropping off of the plug, to determine a detected functional fault in the box 12, 13. For this purpose, the control unit 4 is connected to the control line 16 in such a way that when the supply line 15 fails, the supply to the control unit 4 which is configured for a low energy requirement is ensured without the output stage 5, and a transmission of signals relating to the functional fault is maintained via the data line 11. If the control line 16 is interrupted for the above-mentioned reasons, this can be detected in the actuator module which is affected, and a fault message can be passed on to a central control unit 4 via a CAN bus. An interruption in the control line 6 does not influence the functioning of the actuator modules 2, 3. If the control unit 4 fails, this can also be detected by the other actuator module as a result of the failure of the communication via the data line 11, and corresponding steps can be initiated by said actuator module.

Figure 2:
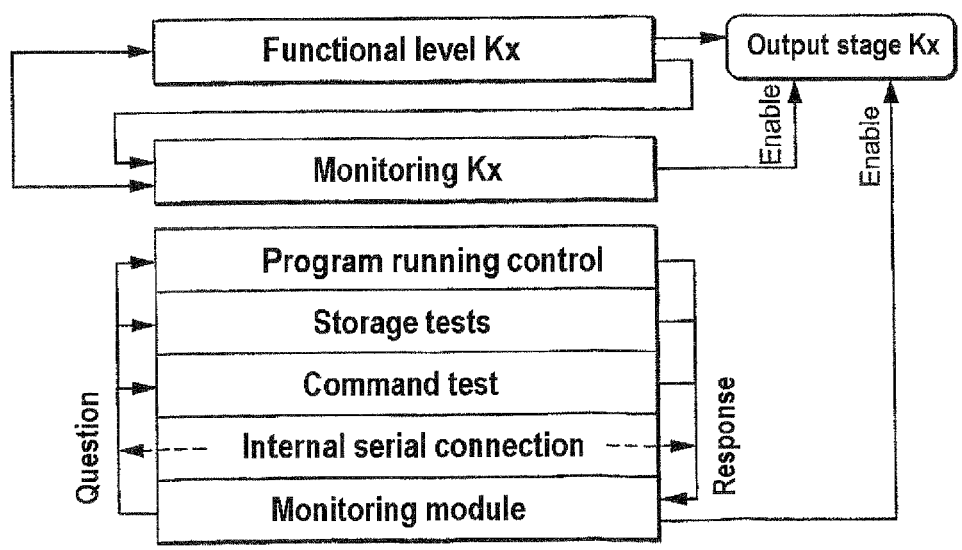
FIG. 2 is an illustration of the function of an actuator module in a block view; 3

FIG. 2 shows a schematic illustration of the functioning of an actuator module such as is shown, for example, in FIG. 1. A desired control value, which is to be set, for the electric motor is output by the functional software at the functional level Kx, and actuation travel or disengagement travel for the friction clutch is thereby output taking into account the transmission ratios between them. In the position controller, a corresponding electrical control value is determined and output at the output stage Kx for the energization of the electric motor. In parallel to this, in a second checking level, checking Kx is carried out which compares the raw value of the manipulated value with that in the functional level Kx. If the comparison is plausible, the output stage Kx is enabled. Irrespective of this, in a third level further checking measures are carried out in the form of a program running control, storage tests and command test, which check the functioning of the microprocessor of the control unit. The operating status of this check is passed on via the data line to the other actuator module and assessed by a monitoring module. If the monitoring is plausible, the output stage Kx is released via a second path. Only if both monitoring processes, specifically a plausible control value is present and it has been checked that the microprocessor has passed the tests which have been carried out, is the output stage released and parallel to this the faultless operating state transferred to the other actuator module. If there is a contradiction in one of the two levels, the output stage is not switched, that is to say the current position of the electric motor, and therefore of the friction clutch, is frozen. A corresponding message is transferred to the other actuator module and an emergency operating mode is initiated, which, for example, immediately adjusts or opens as quickly as possible the friction clutch which is assigned to this actuator module.

Figure 3:
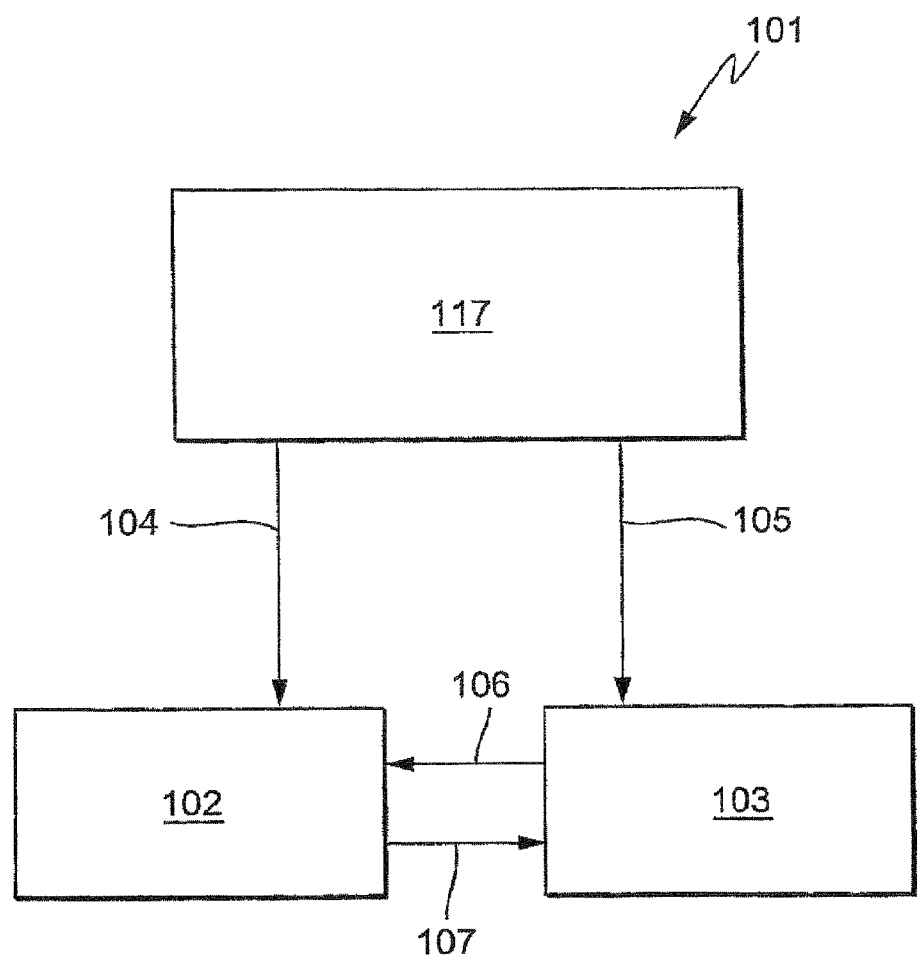
FIG. 3 is a further illustration of the function of a clutch actuator with a superordinate control unit in a block view.

FIG. 3 shows in a schematic illustration as a block circuit diagram a clutch actuator 101 with a superordinate control unit 117 as well as two actuator units 102, 103 with electric motors which actuate the friction clutches assigned to said actuator units 102, 103, and processor units which control said electric motors. In this context, each actuator module 102, 103 is respectively connected to the superordinate control unit 117 by means of a data line 104, 105. Furthermore, the two actuator modules 102, 103 are connected to one another by means of one data line 106, 107 each. The data lines 104, 105, 106, 107 may be physically separate lines or a component of a data communication means such as a CAN bus. The data lines which are represented as arrows here only indicate the direction of the information flow. Of course, the data lines may be configured physically as bidirectional signal lines.

In the superordinate control unit 117, it is possible for the functional software to be implemented here in a first level or control hierarchy which determines control variables, relating to how the friction clutches which are actuated by the actuator modules 102, 103 are to be controlled, that is to say actuated, from requests from superordinate vehicle data and driver requests. Furthermore, a second level may be provided via this level, in which second level the control variables which are output by the functional software are monitored for their plausibility. For example, a processor or a module of the processor which operates independently of processes of the first level can calculate plausibility-checking variables redundantly and/or according to other forms of calculation, said plausibility variables being compared with the control variables of the functional software. If there is a significant difference between the control variables and the plausibility-checking variables, an emergency operating mode, in which, for example, the associated electric motor is switched off, can be initiated.

Further monitoring variables can be transmitted directly or as a third level from the superordinate control unit to the actuator modules 102, 103 via the data lines 104, 105. The two actuator modules 102, 103 can monitor these monitoring variables again for plausibility and make, for example, the switching off of an electric motor dependent on the result of this plausibility checking. For this purpose, monitoring routines can be implemented in a criss-cross fashion in the respective other actuator module 102, 103 and transmitted to the respective other actuator module 103, 102. In this context, the results of the plausibility checks in the superordinate control unit 117 and in the other actuator module 103, 102 are compared with one another for the monitoring of an actuator module 102, 103, and the affected electric motor is switched off only if both plausibility checks provide the same result. Different results may result from, for example, processor defects in the individual monitoring units and/or line breaks therebetween.

LIST OF REFERENCE NUMERALS

1 Clutch actuator
2 Actuator module
3 Actuator module
4 Control unit
5 Output stage
6 Electric motor
7 Commutation unit
8 Position controller
9 Functional software
10 CAN bus
11 Data line
12 Block
13 Block
14 Routine
15 Supply line
16 Control line
101 Clutch actuator
102 Actuator module
103 Actuator module
104 Data line
105 Data line
106 Data line
107 Data line
117 Control unit

The invention claimed is:

1. A clutch actuator for actuating a multi-disk clutch, comprising:
at least two friction clutches composed of at least two actuator modules, each of the at least two actuator modules having an electric motor and a disengagement mechanism which is driven thereby and respectively acts on one of the friction clutches in order to actuate the one of the friction clutches, and the each of the at least two actuator modules having a control unit for controlling and supplying power to the electric motor,
wherein the actuator modules are directly connected to one another by a data line without an intermediary, the data line being configured to carry at least one of digital, electrical, and computerized data.

2. The clutch actuator of claim 1, wherein an operating state of the actuator modules is interchanged via the data line.

3. The clutch actuator of claim 2, wherein a function of at least one other actuator module is controlled as a function of the operating state of one of the actuator modules.

4. The clutch actuator of claim 2, wherein, in the event of malfunction of one of the actuator modules, a fault signal is transmitted via the data line to at least one further actuator module, and at least one further actuator module is operated in an emergency operating mode.

5. The clutch actuator of claim 4, wherein, in the emergency operating mode, a drive of the disengagement mechanism of the actuator modules with a malfunction is prevented, and at least one of actuator modules opens the friction clutch which is assigned to the friction clutch.

6. The clutch actuator of claim 1, wherein the actuator modules have a signal-conducting connection to at least one further device.

7. The clutch actuator of claim 1, wherein the control unit of each of the actuator modules is redundantly supplied with electrical energy.

8. The clutch actuator of claim 1 for actuating at least one friction clutch which is forcibly opened.

9. A method for the control of a clutch actuator for actuating a multi-disk clutch comprising at least two friction clutches composed of at least two actuator modules, each of the at least two actuator modules having an electric motor and a disengagement mechanism which is driven thereby and respectively acts on a friction clutch in order to actuate the friction clutch, and the each of the at least two actuator modules having a control unit for controlling and supplying power to the electric motor,
wherein the actuator modules are directly connected to one another by a data line without an intermediary, which data line carries at least one of digital, electrical, and computerized data, and a functional capability of an actuator module is monitored by means of at least one second actuator module.

10. The method of claim 9, wherein status information of a first actuator module is transmitted to at least one other actuator module via the data line.

11. The method of claim 10, wherein the at least one other actuator module checks the status information for a fault of the first actuator module, and the at least one other actuator module switches into an emergency operating mode if a fault is detected.

12. The method of claim 11, wherein, in the emergency operating mode, a drive of the first actuator module is blocked and the at least one other actuator module opens the friction clutch which is assigned thereto.

13. The method of claim 9, wherein in an emergency operating mode a signal is output to a control unit which is provided for controlling transmission and which disengages a gear speed which is, if appropriate, engaged in a component drive train assigned to the friction clutch with one of the actuator modules which is subject to a fault.

* * * * *